United States Patent
Sumiya

(10) Patent No.: US 9,697,064 B2
(45) Date of Patent: Jul. 4, 2017

(54) SYSTEM, SYSTEM CONTROL METHOD, AND STORAGE MEDIUM

(71) Applicant: CANON KABUSHIKI KAISHA, Tokyo (JP)

(72) Inventor: Mari Sumiya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 127 days.

(21) Appl. No.: 14/602,520

(22) Filed: Jan. 22, 2015

(65) Prior Publication Data

US 2015/0212870 A1    Jul. 30, 2015

(30) Foreign Application Priority Data

Jan. 28, 2014 (JP) .................................. 2014-013570

(51) Int. Cl.
G06F 11/00 (2006.01)
G06F 11/07 (2006.01)

(52) U.S. Cl.
CPC .............................. *G06F 11/0751* (2013.01)

(58) Field of Classification Search
USPC .......................................................... 714/48
See application file for complete search history.

(56) References Cited

U.S. PATENT DOCUMENTS

| | | | | |
|---|---|---|---|---|
| 5,175,852 A * | 12/1992 | Johnson | ...................... | G06F 9/52 |
| 5,485,573 A * | 1/1996 | Tandon | ............... | G06F 11/0781 714/25 |
| 5,990,892 A * | 11/1999 | Urbain | .................. | G06F 11/328 706/61 |
| 6,345,322 B1 * | 2/2002 | Humphrey | .......... | G06F 11/3636 707/999.1 |
| 6,397,244 B1 * | 5/2002 | Morimoto | ........... | G06F 11/0709 709/200 |
| 6,433,893 B1 * | 8/2002 | Murayama | ......... | H04N 1/32101 358/434 |
| 7,127,722 B2 * | 10/2006 | Cheng | .................. | G06F 11/3058 709/224 |
| 7,502,967 B1 * | 3/2009 | Li | ........................ | G06F 11/0715 714/38.14 |
| 7,624,307 B2 * | 11/2009 | Davis | .................. | G06F 3/04895 707/999.2 |
| 7,895,605 B2 * | 2/2011 | Goswami | ............ | G06F 11/3476 714/48 |
| 8,055,940 B2 * | 11/2011 | Ellis | .......................... | G06F 9/52 714/11 |
| 8,930,324 B2 * | 1/2015 | Blaine | ............... | G06F 17/30371 707/690 |

(Continued)

FOREIGN PATENT DOCUMENTS

JP            5-284178 A       10/1993

*Primary Examiner* — Amine Riad

(74) *Attorney, Agent, or Firm* — Fitzpatrick, Cella, Harper & Scinto

(57) ABSTRACT

A system according to the present invention receives a file to be processed, performs data processing to the file and registers identification information of the file if an error has occurred during the data processing on the file. If the system newly receives a file that has identification information identical to the identification information of the file that is registered, the system performs error notification without performing the data processing on the newly received file.

11 Claims, 16 Drawing Sheets

(56) References Cited

U.S. PATENT DOCUMENTS

| | | | | |
|---|---|---|---|---|
| 2002/0073276 A1* | 6/2002 | Howard | ............... | G06F 11/1004 |
| | | | | 711/113 |
| 2006/0190770 A1* | 8/2006 | Harding | .............. | G06F 11/3604 |
| | | | | 714/38.11 |
| 2008/0134214 A1* | 6/2008 | Goswami | ............ | G06F 11/3476 |
| | | | | 719/318 |
| 2009/0119550 A1* | 5/2009 | Shouno | ............... | H04L 41/0677 |
| | | | | 714/47.2 |
| 2009/0300424 A1* | 12/2009 | Kojima | ............... | G06F 11/0715 |
| | | | | 714/39 |
| 2012/0005964 A1* | 1/2012 | Isaacs | .................. | E05D 15/066 |
| | | | | 49/452 |
| 2012/0159255 A1* | 6/2012 | Havewala | ........... | G06F 11/0727 |
| | | | | 714/37 |
| 2014/0317479 A1* | 10/2014 | Candelaria | .......... | G06F 11/1004 |
| | | | | 714/807 |
| 2016/0004607 A1* | 1/2016 | Seki | ......................... | G06F 8/61 |
| | | | | 714/19 |

* cited by examiner

FIG. 18

| No. | Hash value | Registered time |
|---|---|---|
| 1 | 2f12cc6cdf008899cde08a3aed3aaf66 8175afefc762269842fc1f6d7f753a96 | 2013/04/30 8:48 |
| 2 | a8604ea8969ec78b2d59a7e4831469e9 b5661830f1519e14f697dadb9dcd49bc | 2012/11/01 11:50 |
| 3 | a1da8f0e55222542d954f4ef1c03bfeb 836daedf757db6ab20c34c85134609ed | 2012/07/24 9:59 |
| ⋮ | ⋮ | ⋮ |

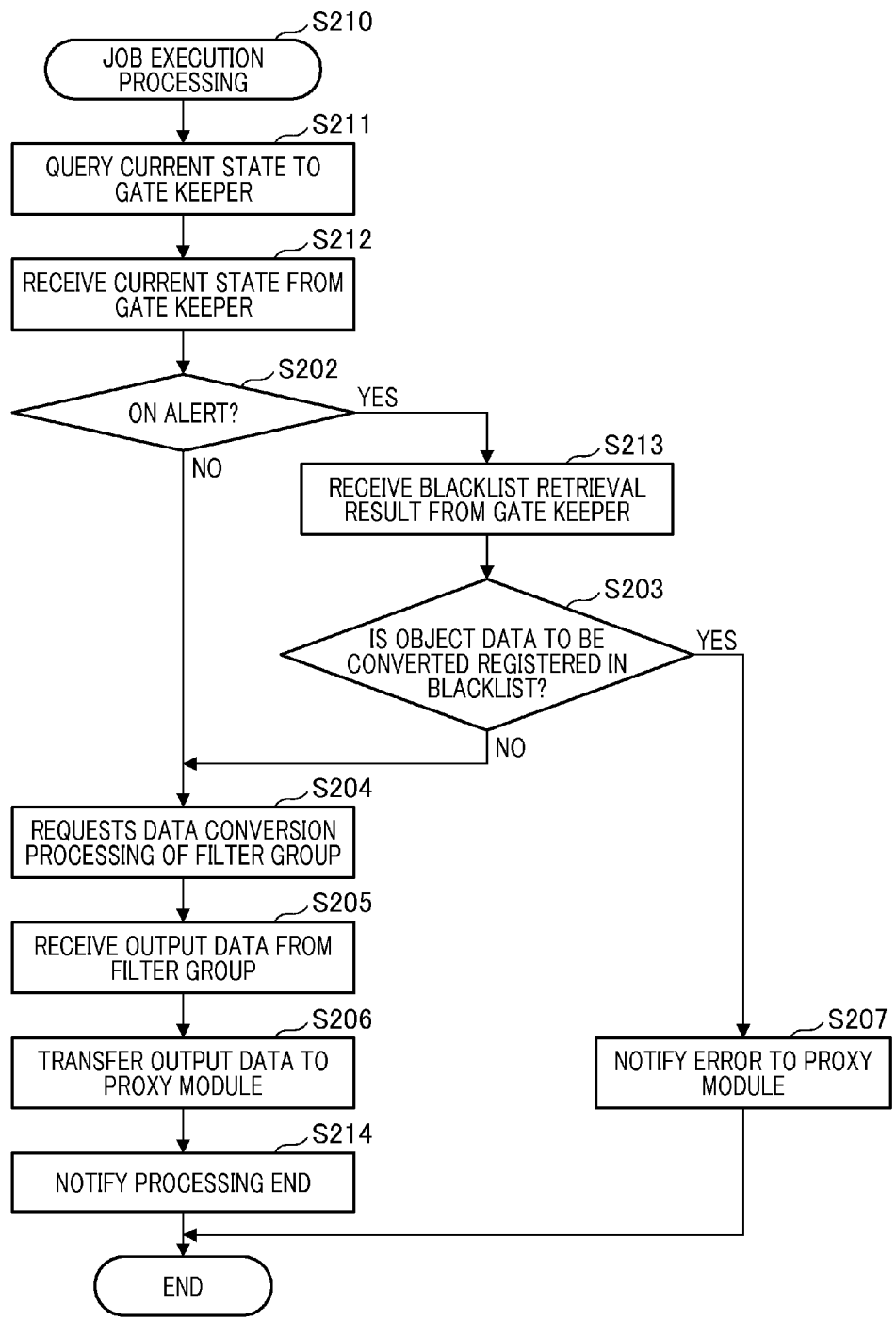

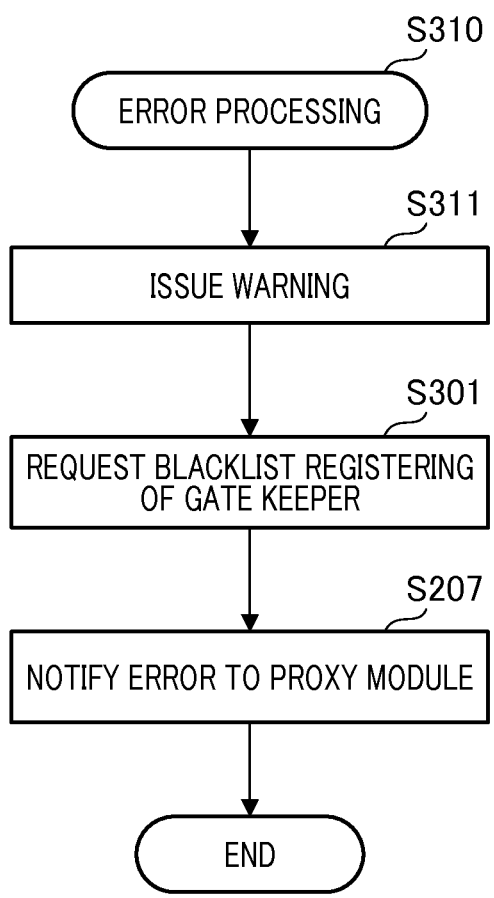

SYSTEM, SYSTEM CONTROL METHOD, AND STORAGE MEDIUM

BACKGROUND OF THE INVENTION

Field of the Invention

The present invention relates to a system to detect inputted improper data, a system control method, and a storage medium.

Description of the Related Art

There has been provided a data conversion service on a server that receives an input data such as document data or image data from a service user, converts the data to printing data, and outputs it to a printing device. The data converting service may receive improper data, from a user that generates error in the service. There are 2 types of improper data. One is data that causes an abnormal end of the system during the data conversion processing and another is data that generates a timeout, for example, by entering an infinite loop. Since the abnormal end and the timeout are caused by the unexpected improper data, they are difficult to prevent. However if an error occurs in the system, the system cannot receive next data until the system recovers. If the system is intentionally attacked by inputting the improper data continuously, other users of the service cannot use the data conversion service. In order to prevent such a situation, the server system must ensure a safety.

Here, a method having a standby system is given as an example of a method for ensuring the safety of the system. In a system including only one data conversion unit, the capability of the entire system becomes low due to the retention of the pending data conversion request. Regarding this event, Japanese Patent Laid-Open No. H5-284178 provides a system that improves the capability of the entire system by arranging a plurality of the data conversion units and distributing the pending data conversion requests uniformly at each of the data conversion units. Even in the data conversion service of the above mentioned server, this corresponds to the input of the improper data from the user by multiplexing the data conversion units and providing the system with redundancy.

Generally, after inputting the input data, the user tends to input the same data continuously when there is no reply from the system in predetermined time. When the data inputted by the user was improper data, the user would continuously input the improper data to the system without realizing that the inputted data has generated an error in a part of the multiplexed system. In the data conversion service of the Japanese Patent Laid-Open No. H5-284178, multiplexing the system is performed in correspondence to the improper data. However, the data conversion service was occupied by the continuous input of the improper data by a non-malicious user, and during that time, the other service users could not use the service temporarily.

SUMMARY OF THE INVENTION

The present invention provides a system in which, if unknown improper data has been received, a similar error occurrence can be prevented in the system if the similar data is received the next time, and the stopping of the system can be prevented.

According to the present invention, a system of an embodiment of the present invention includes a processing unit configured to receive a file to be processed and perform data processing on the file; and a registering unit configured to register identification information of the file if an error has occurred during the data processing on the file. If the processing unit newly receives a file which has identification information that is identical to the identification information of the file that is registered by the registering unit, the processing unit performs error notification without performing the data processing on the newly received file.

According to the system of the present invention, if unknown improper data has been received, a similar error occurrence can be prevented in the system if the similar data is received the next time, and the stopping of the system can be prevented. Therefore, the occupation of the entire system by a specific user continuously inputting the unknown identical improper data can be prevented.

Further features of the present invention will become apparent from the following description of exemplary embodiments with reference to the attached drawings.

BRIEF DESCRIPTION OF THE DRAWINGS

FIG. 18 is a diagram illustrating a content of the blacklist of the printing data conversion system.

FIG. 19 is a process flow illustrating a job execution processing during an alert state.

FIG. 20 is a process flow illustrating an error processing during an alert state.

DESCRIPTION OF THE EMBODIMENTS

First Embodiment

Figure 1:
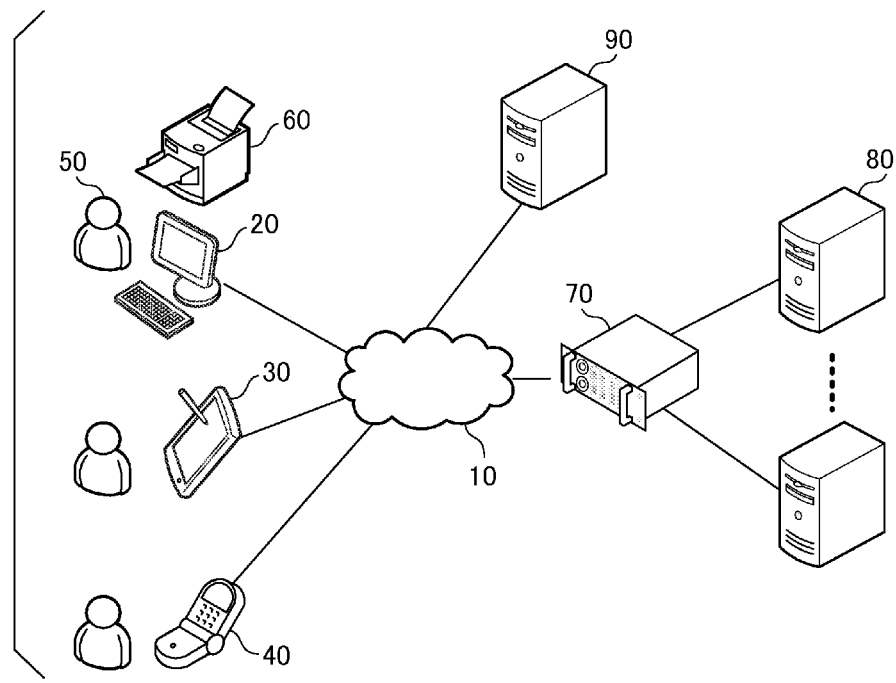
FIG. 1 is a diagram illustrating an exemplary overall configuration of a system according to the present invention.

FIG. 1 is an exemplary configuration of a system according to one embodiment of the present invention. Server PC 80 shown in FIG. 1 functions as the data processing system of the present embodiment. The data processing system provides a service that receives data and a processing request from a client, then performs data processing according to the processing request, and outputs the processed data to the client. Note that the data processing herein denotes converting a data format or editing an image and the like. In an example shown in FIG. 1, a client 50, which requests a data processing, uses a personal computer 20, a tablet PC 30, or a mobile terminal 40 and the like as a device to transmit the processing request. The device at the client side can communicate with the server PC via a network 10, such as the internet or any other network. In FIG. 1, a printer 60, load balancer 70, and a server PC 90 are shown, but they are not essential components in the present embodiment, and thereby they will be described in third embodiment.

Figure 2:
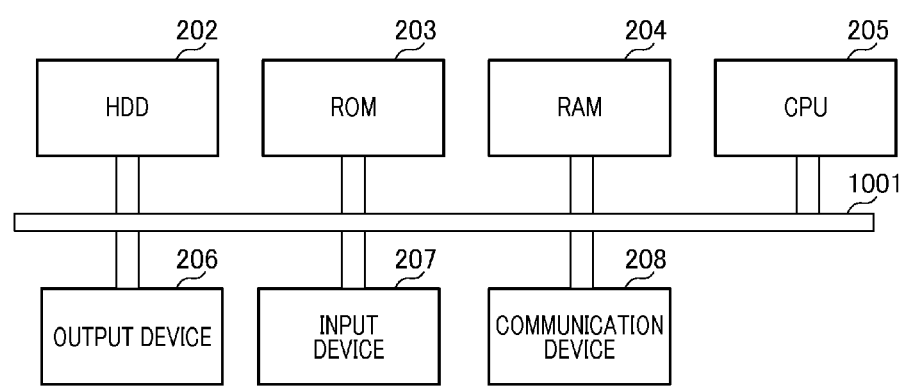
FIG. 2 is a diagram illustrating an exemplary hardware configuration of a server PC.

FIG. 2 is a diagram illustrating an exemplary hardware configuration of the server PC 80. The data processing system is an application program which operates on an OS (operating system), and is stored in a HDD 202 or a ROM 203. A CPU 205 reads out the OS and the application program from the HDD 202 or the ROM 203, and loads it to a RAM 204 to thereby execute and realize various processes. A processing result is stored in the HDD 202 or recorded as a data in the RAM 204. Note that CPU, HDD, ROM, RAM are respectively abbreviations for "Central Processing Unit", "Hard Disk Drive", "Read Only Memory", and "Random Access Memory".

The application program acquires a user input from an input device 207 connected to a computer, or a read value from various sensors. In addition, the application program outputs information to an output device 206 and displays the processing result. Furthermore, the application program communicates with other computers or devices connected to a network via communication device 208. This hardware is configured to connect with each other by a control bus 1001, and thereby to be operated by the application program.

Figure 3:
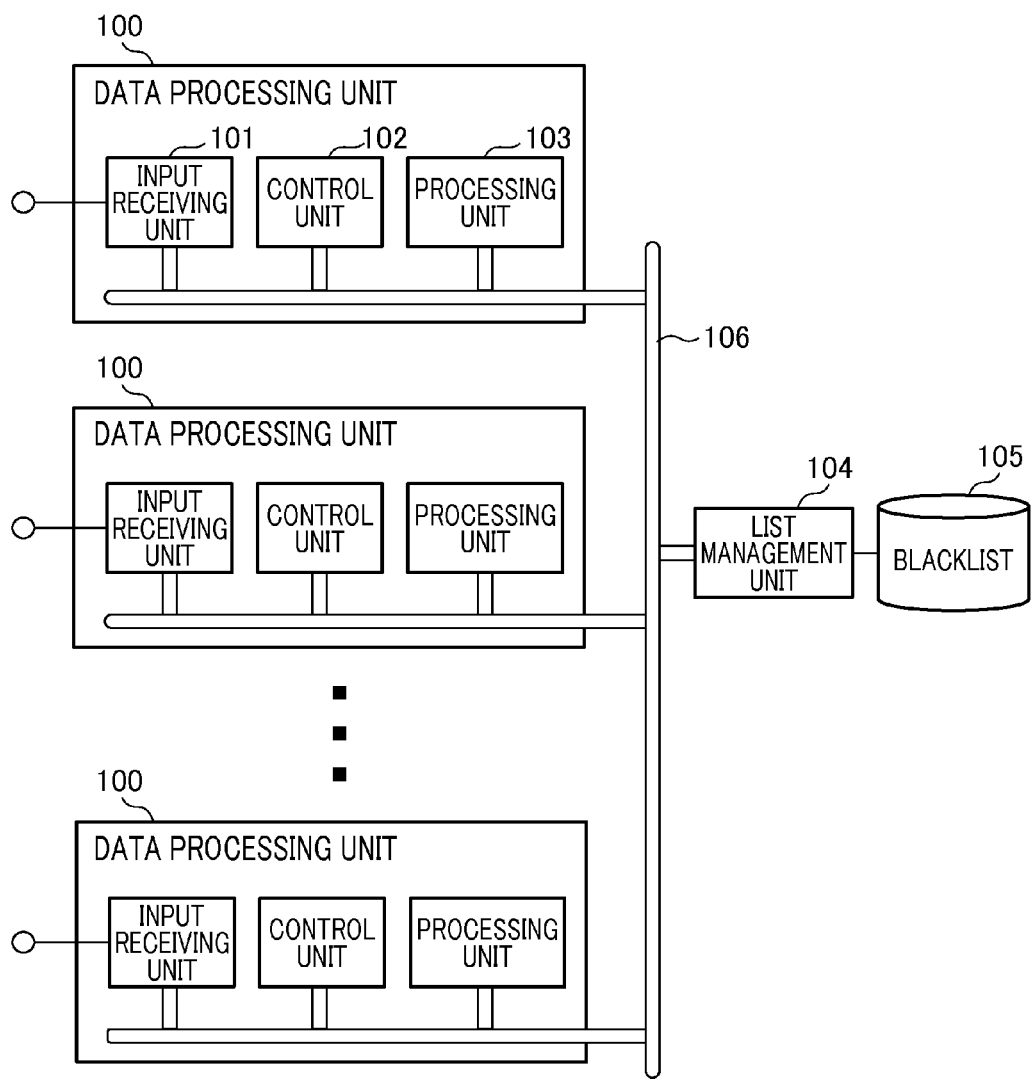
FIG. 3 is a diagram illustrating an exemplary software configuration of a data processing system.

FIG. 3 is a diagram illustrating an exemplary software configuration of the data processing system of the server PC 80. The data processing system includes a data processing unit 100, a list management unit 104, and a blacklist 105. The data processing unit 100 also includes an input receiving unit 101, a control unit 102, and a processing unit 103. These components are connected by a bus 106. Transferring data between these components is performed through the bus 106.

The input receiving unit 101 receives a request such as data processing from the client 50. When the control unit 102 receives the processing request from the input receiving unit 101, the control unit 102 analyzes the processing that is required. The processing unit 103 performs data processing according to the content that the control unit 102 has analyzed.

Here, if the processing unit 103 performs processing on improper data, an error occurs at the processing unit 103 and the processing is forcedly interrupted. Also, error processing is performed after the occurrence of an error, and therefore, the next input data would not be received during that time. Accordingly, the data processing system runs more than one of the data processing units 100 in accordance with a number of files received to multiplex and thereby cope with the continuous input of improper data that causes the error.

The blacklist 105 holds identification information for improper data. The list management unit 104 manages blacklist 105 shared by the data processing units. The list management unit 104 receives an inquiry from the control unit 102, refers to the blacklist 105, and provides a mechanism so that the processing unit 103 does not receive improper data.

Figure 4:
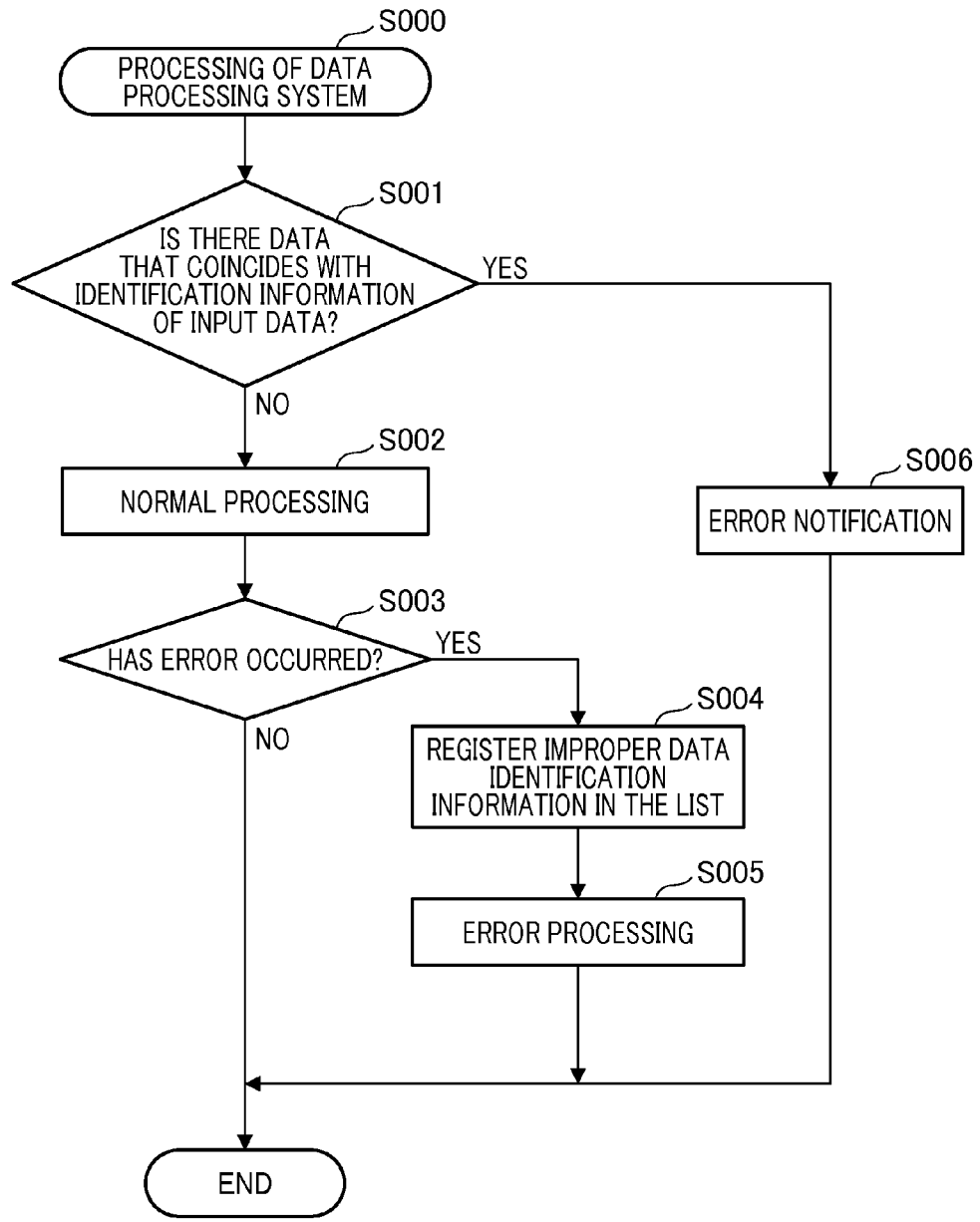
FIG. 4 is a process flow illustrating a processing of a data processing system.

A processing performed by the data processing system of the first embodiment is described below with reference to FIG. 4. When the input receiving unit 101 receives input data and the processing request from the client 50, the data processing unit 100 transfers the input data to the control unit 102, and then starts the processing of S001. In S001, the control unit 102 queries the list management unit 104 about whether there is data that coincides with the identification information of the input data in the black list 105. The identification information of the input data does not need to be the data itself, but may be an ID or a hash value of the data and the like, by which the data can be uniquely identified.

The list management unit 104 extracts the identification information of the input data and determines whether or not the data which coincide with the identification information is registered in the blacklist 105, and returns result to the control unit 102. As a result of the determination, if there is information which coincides with the identification information of the input data in the blacklist 105, the control unit 102 performs error notification related to the input data, which provides notification that the input data is an improper data and is excluded from the processing, in S006 and ends the processing. In the error notification processing, the client 50 is notified about the error from the control unit 102 via the input receiving unit 101. The error notification is performed by transmitting an error message in a mail or by outputting an error message to the Web page and the like. In the error message, a message indicating that the data processing of the input data has not been performed normally is included.

On the other hand, if there is no information that coincides with the identification information of the input data in the blacklist 105, the processing proceeds to S002 and the control unit 102 transfers to the processing unit 103 the input data and the processing request to perform normal processing. In the normal processing, the processing unit 103 executes processing that is requested and returns data that is processed to the control unit 102. In S003, the control unit 102 determines whether or not an error has occurred during the normal data processing. If an error has not occurred, the control unit 102 transfers the received data to the input receiving unit 101, and the input receiving unit 101 outputs the data to the client and ends normally.

If an error has occurred during the normal processing, the processing proceeds to S004. In S004, the control unit 102 regards the input data that has caused the error as improper data and requests the list management unit 104 to register the input data in the blacklist 105. When the identification information of the improper data is registered in the blacklist 105, the control unit 102 ends the data processing (S005). If the data processing unit 100 cannot end normally after the occurrence of an error, error processing such as outputting a log or providing notification about the error to the client and the like is performed.

When the data processing unit 100 receives unknown improper data, the unknown improper data cannot be determined to be improper data by collating that with the blacklist 105 in the processing of S001. However, the data processing unit 100 that has received first the unknown improper data registers the unknown improper data in the blacklist 105 in the processing of S004, and updates the list. Accordingly, after that, it becomes possible to interrupt the input data that has been determined to be improper in the past in the processing of S001 from the system.

When similar improper data have been inputted continuously in the system, the identification information of the improper data is added anew to the blacklist 105 by the first data processing unit 100, and then the similar improper data which is inputted in the system subsequently will be rejected by the system. Thus, when other files having similar identification information with the file in which an error has occurred are received, running processing units other than the one which is processing the file in which the error has occurred do not process the files for regarding that the files are improper files. As described above, according to the data processing system of the present invention, when unknown improper data has been received, the occurrence of the error in the system caused by receiving the same data the next time can be prevented. Therefore, stopping the data processing is prevented.

Second Embodiment

In the data processing system of the first embodiment, the data processing unit 100 calculates the identification information of the input data and looks up whether there is information that coincides with the information in the list in which the identification information of the data that are determined to be improper before are registered. However, for example, when a hash value is used as the identification information of the data from the input data, processing for calculating the hash value requires time. Therefore, the larger the size of the input data, processing speed of the system decreases. The decrease in the processing speed leads to an increase of a re-input of the input data by a service user, and will cause the continuous input of the input data. Accordingly, a way of suppressing decrease in the processing time while preparing for the continuous input of the improper data must be provided.

Figure 5:
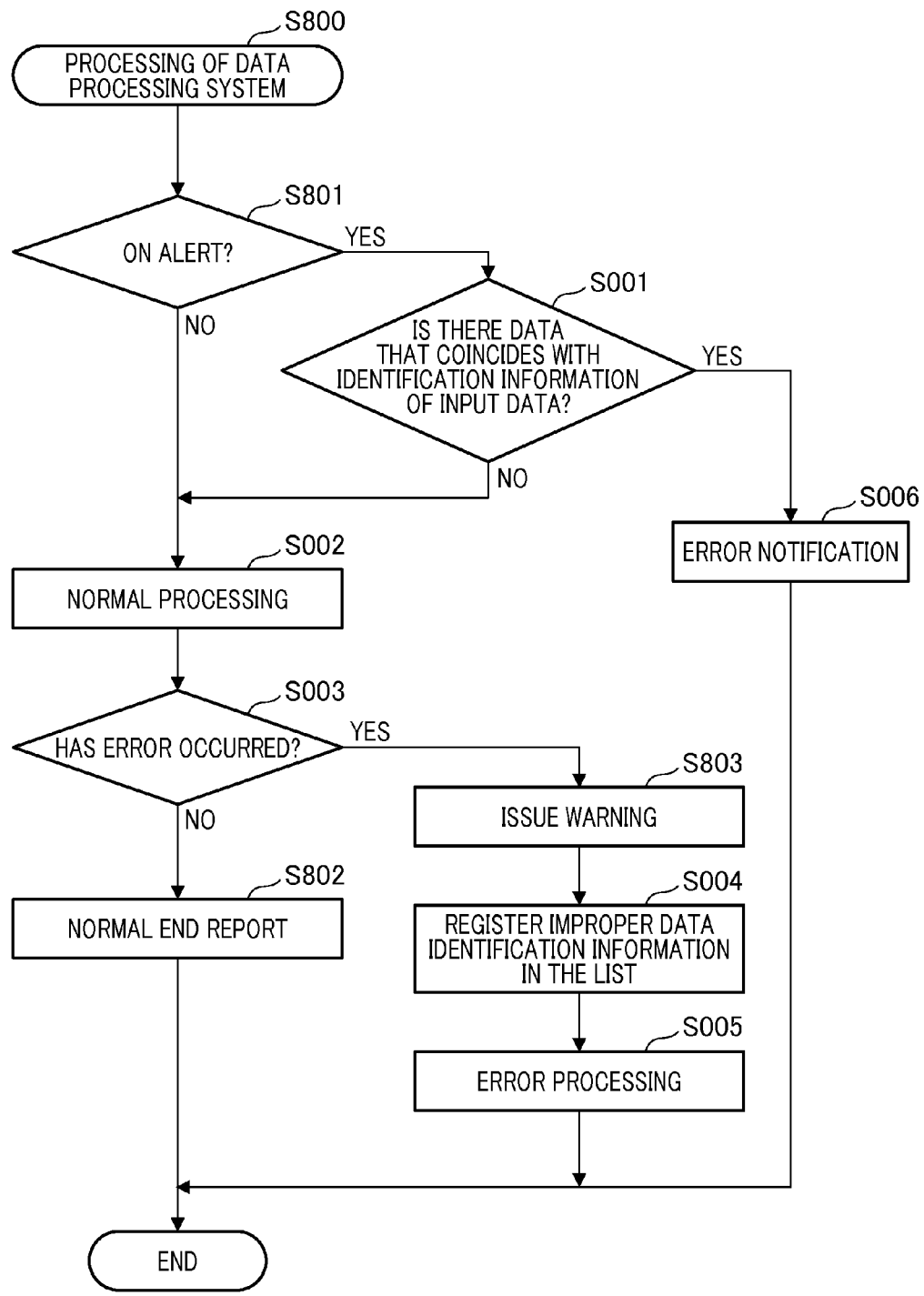
FIG. 5 is a process flow illustrating processing when the data processing system is on alert.

A description will be given of the processing of the data processing system that changes the processing according to a state of the system, in the diagram shown in FIG. 5. The configuration of the data processing system is similar to the first embodiment. Also, processing similar to a step described in FIG. 4 will be denoted by the identical number of the step and a reference sign, and the explanation will be omitted unless otherwise specified.

The processing starts in S800, and the control unit 102 performs determination processing for determining the state of the system in S801. The control unit 102 changes a part of a processing of the system depending on the determination result. There are 2 types of the state of the system, which are "on alert (alert mode)" and "normal mode". In the present embodiment, the state of the system becomes on alert if one or more of the data processing units are stopped due to the improper data being inputted. While the system is on alert, if the processing of the data processing units normally ends continuously for predetermined times, then the alert is canceled. Furthermore, the list management unit 104 carries a management of the state of the data processing system.

The control unit 102 performs determination processing of S001 similar to the first embodiment when it is determined that the system is on alert in S801. When the system is not on alert, the determination processing of S001 is not performed and the normal processing of S002 is performed. In other words, while the data processing system is receiving normal input data, the received input data is not examined and the normal processing is performed.

In S003, the control unit 102 determines whether or not an error has occurred. When an improper data has been inputted and the error has occurred, the processing proceeds to S803 and a warning is issued. In other words, the state of the data processing system switches the mode to shift to the alert mode. From this, the data processing system increases alert against the improper data. While the system is on alert, the control unit 102 examines input data and only the data which has passed the examination becomes the target of the normal processing.

Figure 6:
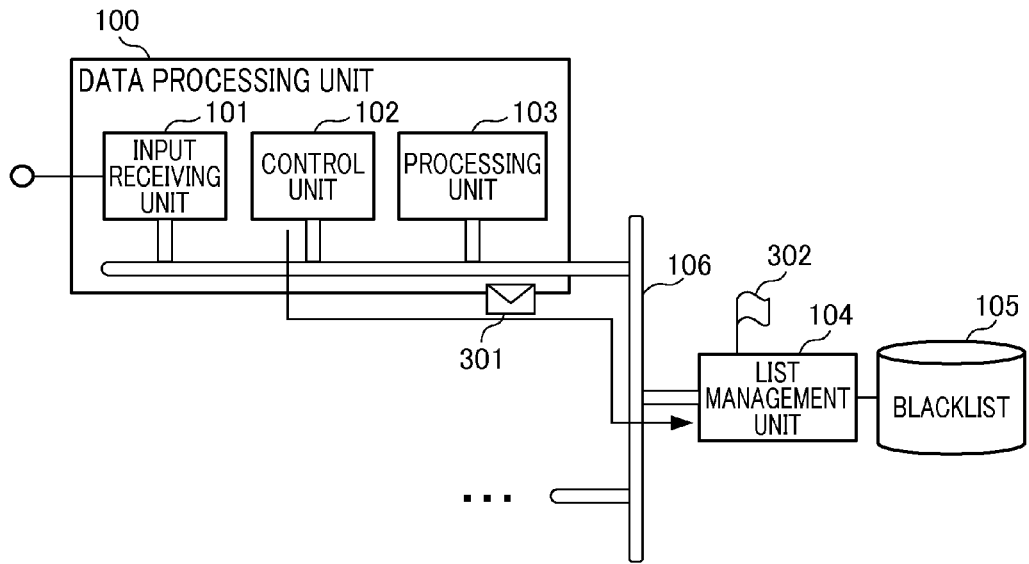
FIG. 6 is a diagram illustrating a mechanism for putting the data processing system on alert.

In S003, when an error occurs during the normal processing, the processing proceeds to S803 and the control unit 102 issues a warning. FIG. 6 is a diagram illustrating an example of issuing a warning. As shown in FIG. 6, the control unit 102 transmits an alert message 301 to the list management unit 104. When the list management unit 104 receives the alert message 301, the list management unit 104 sets an alert flag 302. In other words, in the data processing system that is redundant and performs distributed processing on files received continuously, if errors occur in one or more of the data processing units, the data processing system shifts to the alert mode.

In the data processing unit 100 to which data has been inputted while the alert flag 302 is set, it is determined that the system is on alert in the processing of S801, and the examination of the input data S001 is performed every time when there is an input. In S002, when the control unit 102 determines that the normal processing has ended normally, the processing proceeds to S802 and a normal end report is issued to the list management unit 104.

Figure 7:
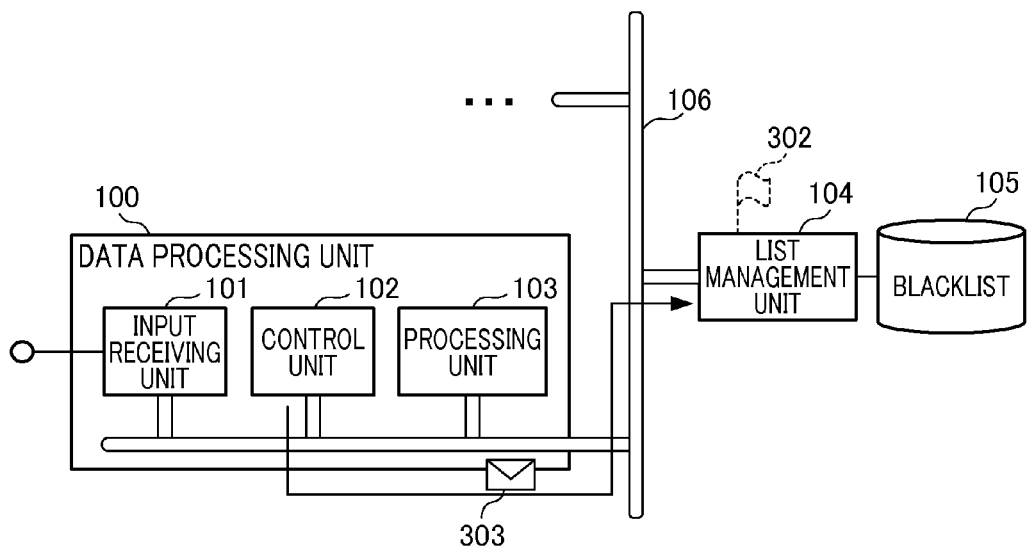
FIG. 7 is a diagram illustrating a mechanism for canceling the alert of the data processing system.

FIG. 7 is a diagram illustrating an example of canceling the alert when the list management unit 104 has received the normal end report. In the processing of the normal end report, the control unit 102 transmits a completion message 303 to the list management unit 104. The completion message 303 may be transmitted only when the data is inputted and normally ended while the alert flag 302 is set. While the alert flag 302 is set, if the completion messages 303 continuously reach the list management unit 104 by a predetermined time, the list management unit 104 lowers the alert flag 302 and the alert is canceled. In other words, after the occurrence of the error by the improper data, if the improper data have not been inputted to the data processing unit 100 continuously by the predetermined time, it is assumed that the possibility of the improper data being inputted has become low, and the data processing system cancels the alert.

As described above, the data processing system according to the second embodiment shifts the state of the system to the alert mode when errors have occurred in one or more of the processes due to improper data being input, and the alert is canceled when the processes have normally ended continuously for predetermined times while the system is on alert. According to the present system, the system is configured to analyze the input data only when it is required to ensure safety, and the system enables avoiding the service being intentionally occupied by the continuous input of improper data by a specified user while suppressing decreases in the processing speed.

Third Embodiment

A description will be given of the printing data conversion service, which converts the printing data, on the server as an example of the data processing system having the configuration of the first and the second embodiment, with reference to FIG. 1 again. The system of the third embodiment includes the devices 20 to 40 which are client side devices that request the printing conversion service, the printer 60, and the devices 70 to 90, which are service providing side devices. The server PC 80 shown in FIG. 1 functions as the printing data conversion system of the present embodiment. The client PC 50, which requests the conversion of the printing data, uses devices such as the personal computer 20, the tablet PC 30, the mobile terminal 40 and the like as devices that transmit a conversion request for the printing data. The client 50 uses applications (not shown) operating inside these devices and requests converting the printing data of the printing data conversion unit 330 (described below with reference to FIG. 8).

The printing data conversion unit 330 is a program operated as what is referred to as a "Web service", which opens a known URL to the public on the server PC 80. In the server PC 80, a Web communication unit 310, which transfers the request that has reached the URL to the printing data conversion unit 330, is also operated. Since the number of the requests that reach the URL normally becomes large, the server PC 80 is not configured to process singly, but is configured to process by a plurality of the server PCs 80. Accordingly, the load balancer 70 is installed in the front stage of the plurality of the server PCs 80 and requests that are transferred to each of the server PCs 80 are distributed uniformly.

A service provided by the printing data conversion unit 330 is converting data specified from the client 50 to formats that can be printed by the printer 60. As the data specified by the client, there are formats created by various application programs such as document, image file and the like. In contrast, data received as printing data by the printer 60 is different from the aforementioned formats and is data described in PDL, or data described in PJL, which includes commands and parameters to control the printing, such as the number of copies and the like. PDL is an abbreviation for "Page Description Language". PJL is an abbreviation for "Print Job Language".

As described above, since there are differences between the client 50 and the printer 60 with respect to data formats which they handle, a program is required to cover the difference. Normally, a program referred to as a "printer driver" performs this conversion processing. The printer driver is normally operated on a PC on which the aforementioned application program operated by the client 50 is operated. However, since the processing of the printer driver is a heavy processing that requires relatively many resources such as CPU, memory and the like, if the resources held by the PC operated by the client 50 are few, the processing becomes time-consuming so that it is not practical enough. The more the demand of a printing from a terminal which has relatively few resources, such as the terminal operated by the client 50 (the personal computer 20, the tablet PC 30, or the mobile terminal 40), increases, the more the importance of performing the processing of the printer driver by the service on the internet.

The client 50 requests to convert the printing data to the format that can be printed by the printer 60 from the various terminals to the aforementioned URL. In accordance with the request, the converted data, which is generated by the printing data conversion unit 330 operated on the server PC 80, is returned to the client terminal. The converted data may be stored in the file server PC 90, which is accessible from the printing data conversion unit 330, depending on the instruction of the client 50. A hardware configuration of the server PC 80 on which a group of software including the printing data conversion unit 330 operates is similar to the configuration shown in FIG. 7 and so the description thereof is omitted.

Figure 8:
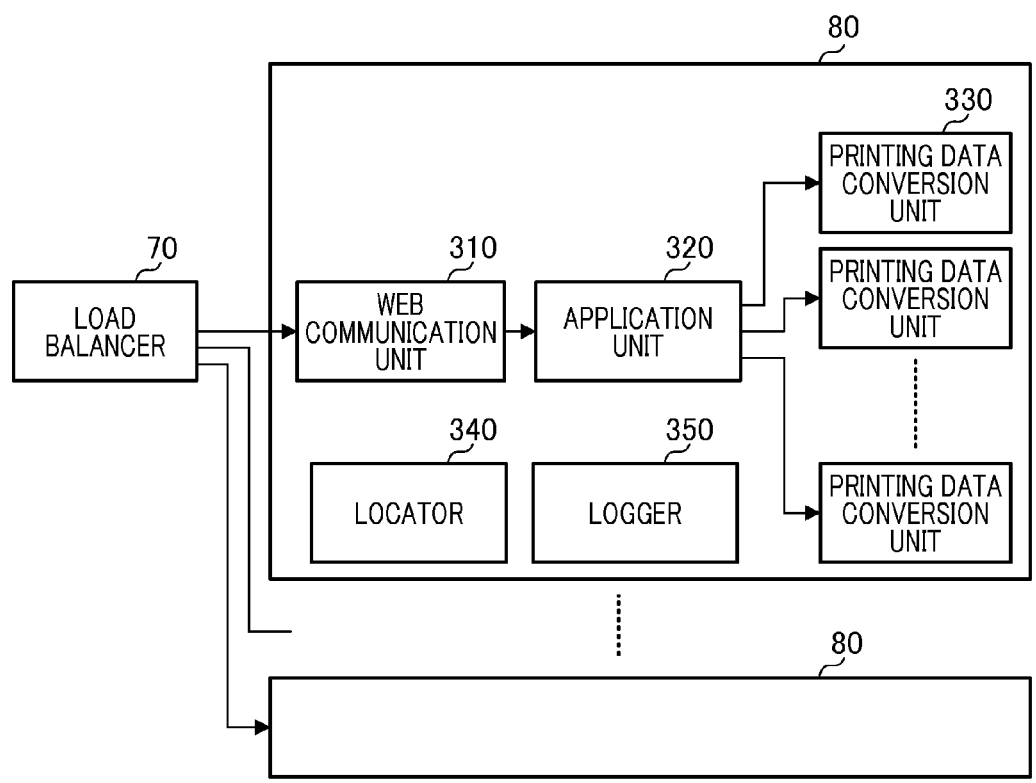
FIG. 8 is a diagram illustrating an exemplary software configuration for a printing data conversion system.

FIG. 8 is a diagram illustrating a software configuration of the printing data conversion unit 330. The server PC 80 includes the Web communication unit 310, an application unit 320, the printing data conversion unit 330, a locator 340, and a logger 350. The Web communication unit 310 receives a request transmitted by HTTP protocol from an application on the personal computer 20 operated by the client 50. The load balancer 70 is positioned in front stage of the Web communication unit 310, and allocates the requests to the Web communication unit 310, which operates on a plurality of the server PCs 80. There are various known methods for allocating, but a detail thereof has no relation to the present invention. Therefore, the description is omitted.

Here, the server PC 80 does not necessarily denote one physical server PC. In recent years, virtualization technology that creates a plurality of virtual PCs on a single PC has become common. In terms of the software, it cannot be determined whether or not the operating system on which the software itself is operating is created virtually, or that a determination is not necessary. Accordingly, the server PC 80 of the present invention may denote "in case of the virtual PC". Hereinafter, an expression "PC" denotes both the physical PC and the virtual PC.

The application unit 320 is software that analyzes the specified URL as a transmission destination of the request, and determines the related printing data conversion unit 330. Normally, the Web communication unit 310 and the application unit 320 are capable of handling a plurality of kinds of services, and can specify the corresponding service based on the URL and distribute the requests. In the present embodiment, it is assumed that one of the plurality of services is the printing data conversion unit 330. There are other services that are operating other than this service, but in the description of the invention, services other than the printing data conversion unit 330 are omitted.

The printing data conversion unit 330 corresponds to the data processing unit 100 of the first and the second embodiments, and is configured by components respectively corresponding to the input receiving unit 101, the control unit 102, and the processing unit 103. Similar to the data processing unit 100, the plurality of the printing data conversion units 330 is started in accordance with the number of files received and the like. A filter pipe line, which is newly introduced in the present embodiment, is used to transfer converting data. Furthermore, two components are added that are required to realize the printing data conversion service and are common to the respective printing data conversion service, other than a component that corresponds to the list management unit 104.

The printing data conversion unit 330 is not a single process but is a form that provides the printing data conversion service by operating a plurality of processes in cooperation. When it is described as a "printing data conversion service" below, note that this plurality of processes are referred to by a common term. The locator 340 and the logger 350 are processes that exist independently of the printing data conversion unit 330. The application unit 320 starts the plurality of the data conversion units 330, and distributes the requests respectively to execute a plurality of requests in parallel. Even in this case, the locator 340 and the logger 350 exist separately as one process. The application unit 320 also manages a session to specify the series of requests from the client 50 when the printing data conversion unit 330 is in operation. Specifically, session affinity in which identical requests from the client 50 are transferred to the identical printing data conversion unit 330 is realized.

(Printing Data Conversion Service)

Figure 9:
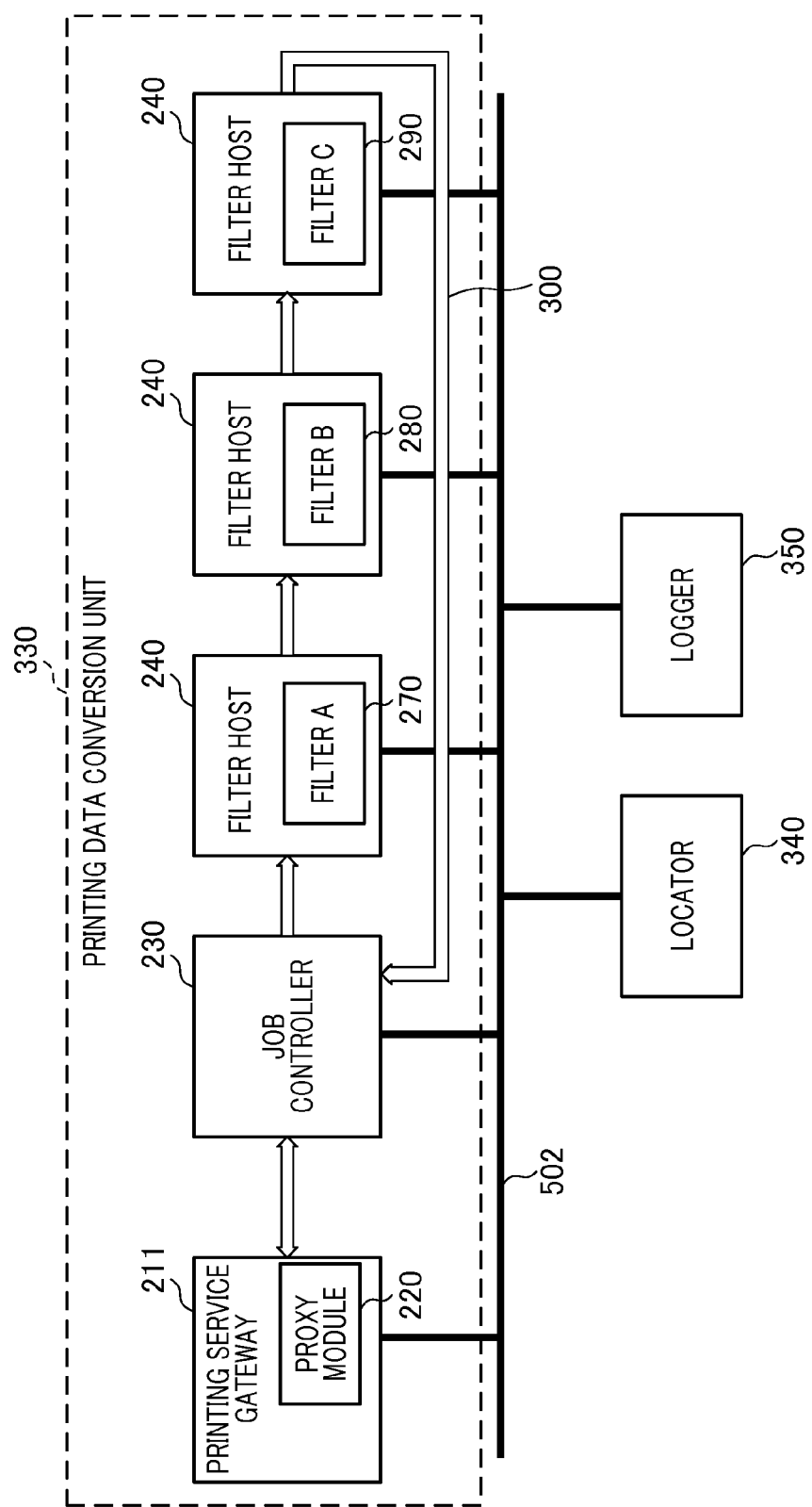
FIG. 9 is a diagram illustrating a component group relating to the operation of a printing data conversion unit.

FIG. 9 is a diagram illustrating the relations of a software component group that relates to an operation of the printing data conversion unit 330. The printing data conversion unit 330 is operated by the plurality of processes in cooperation as described above. The components are a printing service gateway 211, a proxy module 220, a filter host 240, and various filter groups (270, 280, 290). Here, three types of the various filters are indicated for an explanation, but practically there are many filters, and also the combination of the filters is not fixed and different filters may be used for each generated printing data conversion unit 330.

(The Printing Service Gateway)

The printing service gateway 211 that exist as a process receives a service request for the printing data conversion unit 330. The printing service gateway 211 corresponds to the input receiving unit 101 of the first embodiment. The application unit 320 starts the printing service gateway 211. The printing service gateway 211 reads the proxy module 220 and calls function groups that are provided as an Application Programming Interface (API) to thereby request the execution of the converting processing, and furthermore receives the result.

(Locator)

The locator 340 used by the component group that configures the printing data conversion unit 330 plays a special role. The locator 340 is a special process that has already been started at the time when the application unit 320 is started. The locator 340 includes a function for generating a component. Furthermore, the locator 340 provides a function for replying to access points of other components in response to requests from other components. An access point indicates a listening port of TCP/IP. One component acquires an access point that is opened by another component, and uses the function provided by the component by accessing the access point.

(Job Controller)

A job controller 230 corresponds to the control unit 102 of the first embodiment. The job controller 230 which has been requested a job execution through the proxy module 220 analyzes the job and the printing data included in the job, and selects a filter required for the conversion. Next, the job controller 230 acquires the printing data format of a conversion destination, which is included in the job, and at the time when the data format of a conversion source and the conversion destination has been confirmed, the job controller 230 selects the filter groups required for the conversion. Combinations of the required filters and order of conversion thereof are implemented in the job controller 230 as fixed knowledge.

After selecting the required plurality of filters, the filter host 240 that loads these filters is acquired. In this example, as filters required, a filter A 270, a filter B 280, and a filter C 290 are required, and these are loaded to the filter host 240 respectively.

The job controller 230 generates a so-called "pipeline" 300 that is a data transfer channel between the filter A 270, the filter B 280, and the filter C 290. The pipeline 300 basically transfers data in only one direction. The pipeline is configured so as to circulate through the job controller 230→the filter A 270→the filter B 280→the filter 290→the job controller 230. Also, the job controller 230 generates the pipeline 300 between the proxy module 220. By generating pipeline 300 in this way, the printing data returns from the proxy module 220 to the plurality of the components, and finally returns to the proxy module 220 again in a form that the conversion has been ended.

(Filter, Filter Host)

The filter is prepared in the form of library module that has implemented only the data conversion processing, and corresponds to the processing unit 103 of the first embodiment. The filter host 240 exists as a process and loads the specified filter at the time of execution. The filter host 240 is in charge of connecting, transmitting, and receiving the message to the control bus 502, communicating with the job controller 230, transferring log output of the filters to the logger 350, and the like.

(Logger)

The logger 350 exists as one process on the identical control bus 502. The components on the control bus 502 perform log output during the execution of the job. Each of the components transmits the log data to the logger 350 via a network, and the logger 350 outputs the log file at the time when a predetermined amount of the log data has been stored.

(Conversion Job)

Here, a description will be given of the data that circulates the pipeline 300. The data is called "conversion job". The conversion processing is transferred in a form of a conversion job (hereinafter simply referred to as "job") when requested through the API of the proxy module 220. The job is conceptually configured by what is referred to as a "ticket" data configuration that the object data to be converted and setting values for the conversion processing and the like are bundled in a collective form. The job is given unique identification information (job ID) so as to be identified. The generated job is stored in a storage device such as HDD 202 as a file. When extracting the job from the storage device, it is possible to specify the job ID to acquire the file and to refer to the content. Also, the action of the destruction of the job is realized by removing the file. The job includes the content of the printing data directly in the file or includes reference information such as the file path of the filed printing data. Furthermore, the job includes information about the file format that the printer 60, which performs the printing, can process. Also, the job includes printing settings to instruct a way of printing, such as the number of copies, the imposition instruction for printing and the like.

(Error of Improper Data Inputted)

When a job that includes improper data is inputted, the printing data conversion unit 330 cannot normally execute the job. There are two types of improper data. One is data that generates an error such as access violation or overflow during the conversion processing in the filter, and the filter ends abnormally. When the filter abnormally ends during the conversion processing, the printing data conversion unit 330 also ends the process of the filter host 240 that has loaded the filter. Accordingly the pipeline 300 that has connected the filter groups and the job controller 230 is cut.

Another type of the improper data is data that occupies the filter for a long time, such as by entering an infinite loop and the like during the conversion processing in the filter. Each of the filters starts the system timer of the operating system when starting the conversion processing and measures the time required for the processing. When the conversion processing has not finished by a predetermined time, a timeout message will be transmitted to the filter from the system timer. Also, other than these errors depending on the data, the printing data conversion unit 330 generates errors against a job that does not include improper converting object data due to a timing of inputting the data.

Figure 10:
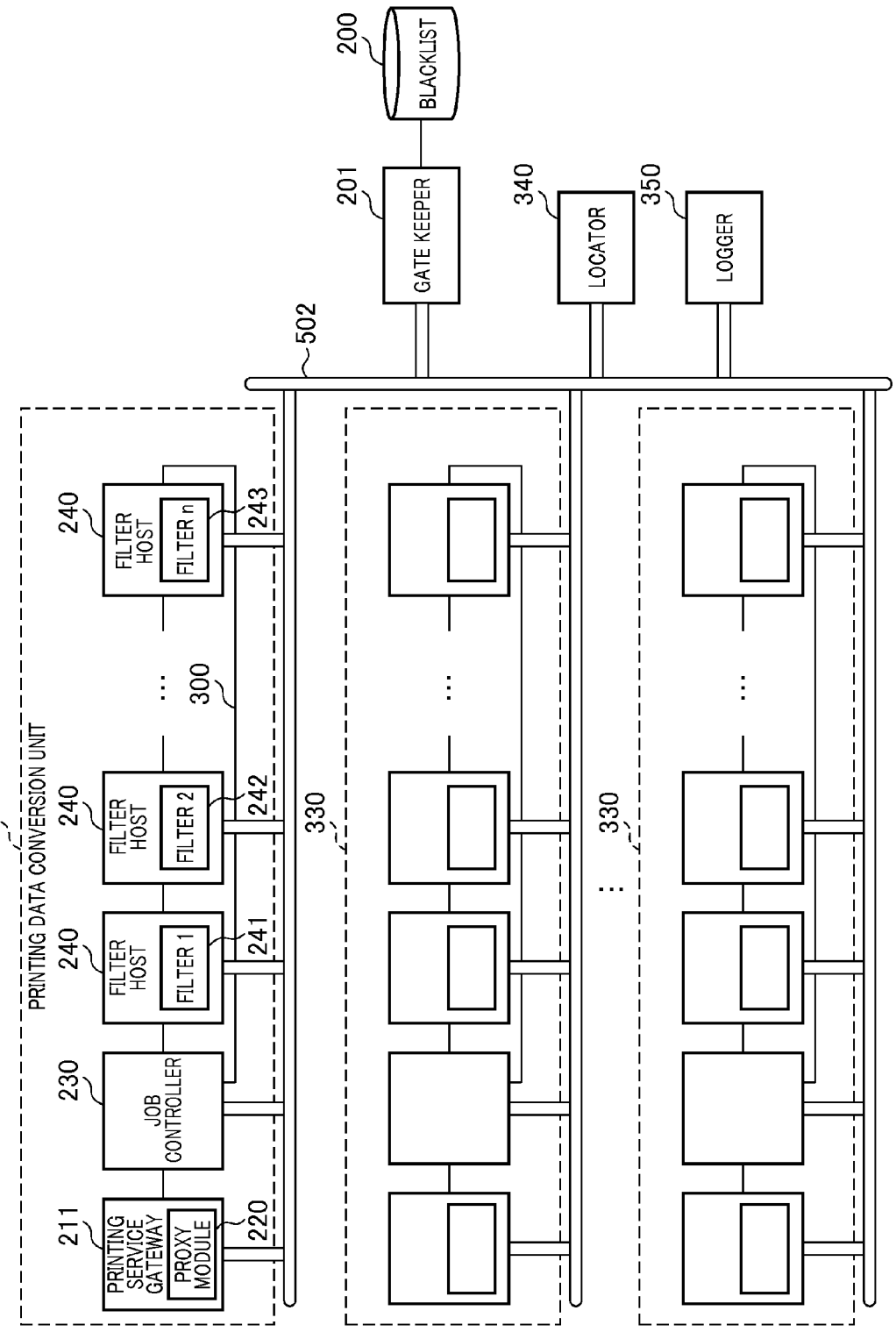
FIG. 10 is a diagram illustrating an exemplary software configuration of the printing data conversion system.

Hereinafter, a description will be given of an embodiment for which the specification is applied to the aforementioned printing data conversion unit 330. FIG. 10 illustrates an exemplary configuration of the printing data conversion unit 330 of the present embodiment. The printing data conversion unit 330 includes a plurality of the printing data conversion unit 330, the locator 340, the logger 350, and the gate keeper 201. Each of the components is connected with the same control bus 502.

When one unknown improper data is inputted, the printing data conversion unit 330 firstly retrieves corresponding information (hereinafter referred to as "blacklist retrieving") from the blacklist 200 that stores the identification information of the data that has been determined before to be improper data. When the corresponding information is not detected, the printing data conversion unit 330 starts the normal conversion processing after the blacklist retrieving has ended. Due to the improper data, in the filter which is loaded by the filter host 240 and performs the conversion processing, an error occurs during the conversion processing.

Then, the printing data conversion unit 330 firstly adds the identification information of the improper data as error processing on the blacklist 200, which is managed by the gate keeper 201. After this, processing required for the error processing such as an error notification or log output and the like is performed. The printing data conversion unit 330 cannot receive the next job in the same process until the error processing has completed. However, when a similar improper data is inputted to a process of other printing data conversion units 330 on the same server PC 80 during the aforementioned error processing, the identification information of the inputted data will be detected by the blacklist retrieving. Without waiting for the process of the printing data conversion unit 330, which is executing the aforementioned error processing, to be restored, the same improper data which is inputted continuously can be rejected from the processes of the parallel printing data conversion units 330 on the same server PC 80.

One gate keeper 201 exists for the plurality of the printing data conversion units 330 that run on the identical server PC 80 and are connected to the same control bus 502. The gate keeper 201, similar to the list management unit 104 of the first embodiment, carries out the processing of calculating the identification information and blacklist retrieving, and notifying the job controller 230 about the result, and then adding the data of the identification information to the blacklist 200. Each processing is performed by the request from the job controller 230.

Also, in the third embodiment, a hash value of the object data to be converted is used as the identification information for the object data to be converted. As a method for obtaining the hash value, for example, hash functions such as SHA-2 and the like are known, but it is not limited thereto. Any methods to obtain a hash value that can uniquely identify the object data to be converted may be applied. A calculation object of the hash value is not limited to the entire object data to be converted and may be a part of the object data to be converted, the entire job that combines the object data to be converted and the ticket, or a part of the job. An example of the blacklist 200 that stores the hash value of the improper data is shown in FIG. 18. The blacklist shown in FIG. 18 registers information such as the hash value, the registered time and the like.

A description will be given of a flow of processing after generating the components required for executing the conversion processing of the printing data conversion unit 330, by the locator 340, and the job controller 230 has requested the job execution by the proxy module 220.

Figure 11:
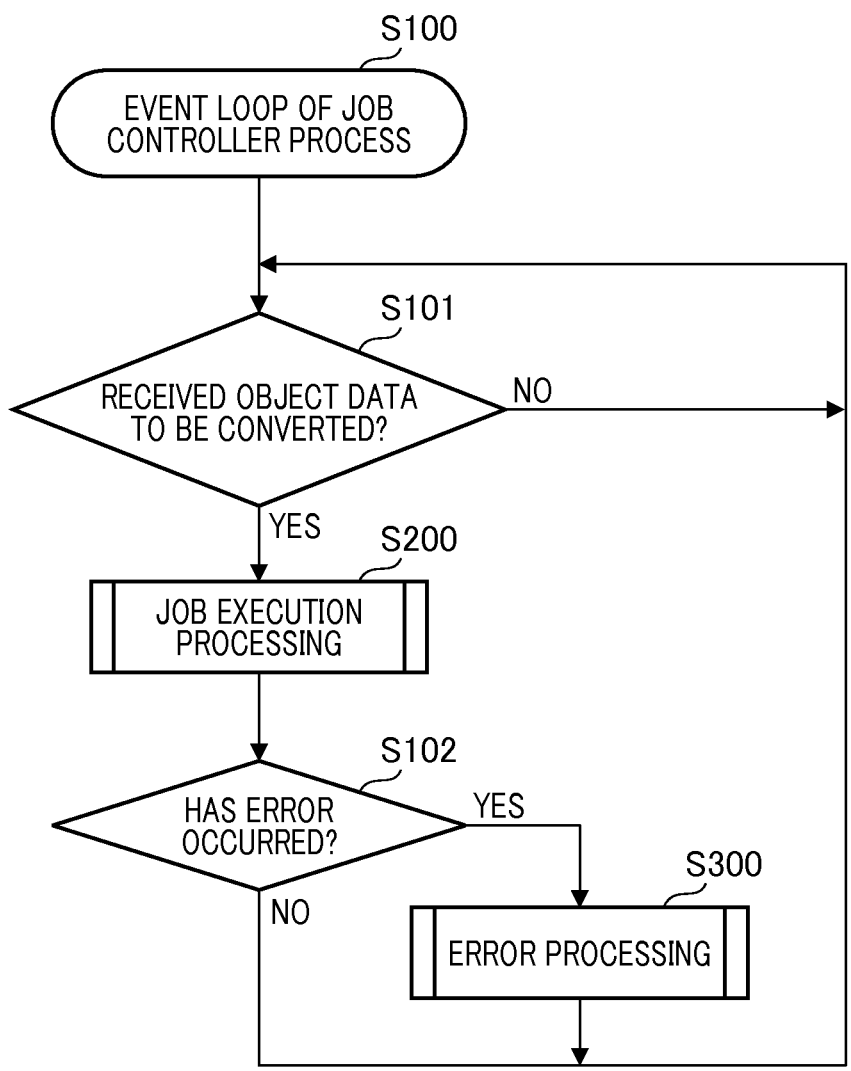
FIG. 11 is a process flow illustrating an outline of the processing of the printing data conversion system.

FIG. 11 illustrates an event loop processing that starts at the time when the job controller 230 has been generated. The job controller 230 continues circulating the loop while waiting for 2 events until the own process ends. The events are "job acquisition" and "error occurrence". Firstly, in S101, the job controller 230 determines whether or not the object data to be converted is acquired. When the object data to be converted is acquired, the processing proceeds to S200, and the job controller 230 executes the job execution processing shown in FIG. 12. Subsequently, in S102, the job controller 230 determines whether or not an error has occurred during the data conversion processing. When an error has occurred, the processing proceeds to S300 and the job controller 230 executes the error processing shown in FIG. 13.

Figure 12:
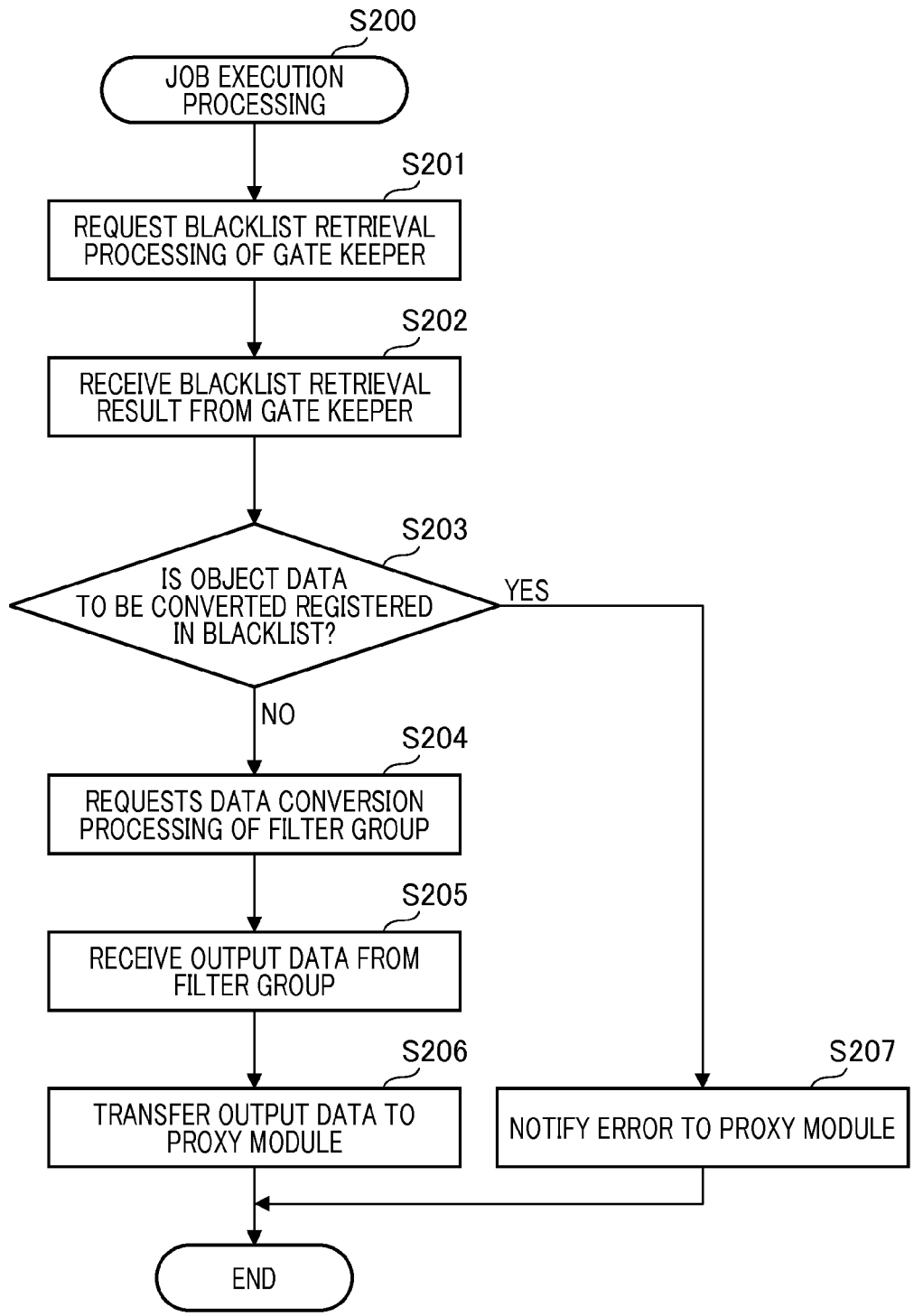
FIG. 12 is a process flow illustrating a job execution processing.

FIG. 12 illustrates a process flow of the job execution processing (S200) by the job controller 230. In S201, the job controller 230 transfers the object data to be converted to the gate keeper 201 in order to request a blacklist retrieval processing of the gate keeper 201. The blacklist retrieval processing (S400) is described below with reference to FIG. 14. In S202, the job controller 230 receives a blacklist retrieval result from the gate keeper 201 and then, in S203, determines whether or not the object data to be converted is registered in the blacklist 200. When it is determined that the object data to be converted is registered in the blacklist 200, in S207, the job controller 230 notifies the proxy module 220 about the error and ends the job execution processing.

In contrast, when the object data to be converted is not registered to the blacklist 200, the processing proceeds to S204 and the job controller 230 requests the data conversion processing of the filter group. The data conversion processing (S500) is described below with reference to FIG. 16. When the filter group ends the data conversion processing, in S205, the job controller 230 acquires output data. When the job controller 230 receives the output data, in S206, the job controller 230 transfers the output data to the proxy module 220 and ends the job execution processing.

Figure 14:
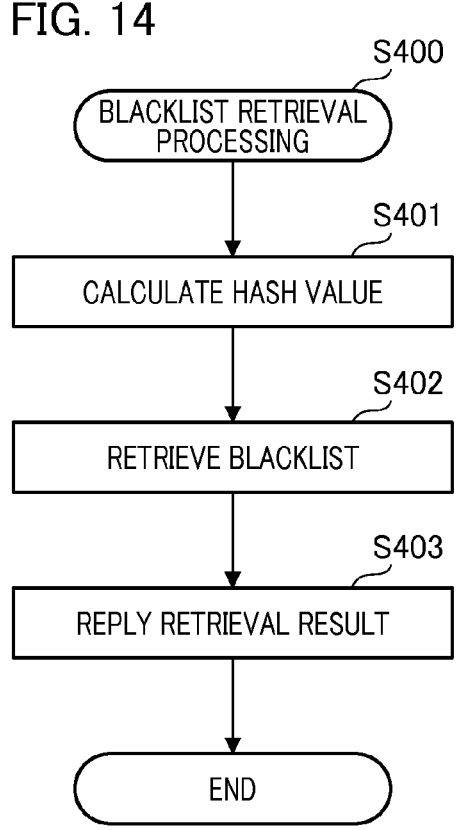
FIG. 14 is a process flow illustrating a blacklist retrieval processing.

FIG. 14 illustrates a process flow of the blacklist retrieval processing (S400) by the gate keeper 201. When the gate keeper 201 receives a request for blacklist retrieval processing and the object data to be converted from the job controller 230, in S401, the gate keeper 201 calculates the hash value of the object data to be converted. In S402, the gate keeper 201 retrieves the information that coincides with the calculated hash value from the blacklist 200 and, in S403, returns the retrieval result to the job controller 230.

Figure 16:
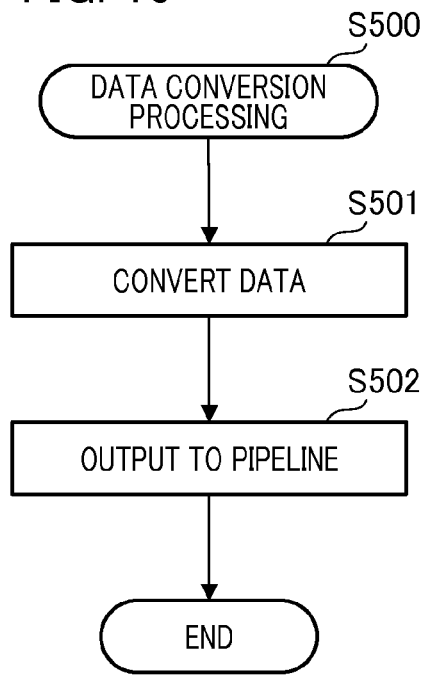
FIG. 16 is a process flow illustrating a data conversion processing of a filter.

FIG. 16 illustrates a process flow of the data conversion processing (S500) by each of the filters. The data conversion is performed by a plurality of filters in accordance with the job. In an example shown in FIG. 10, the filter group is configured by n filters (filter 1 (241), filter 2 (242), . . . , filter n (243)). Each of the filters performs the data conversion of which it is respectively in charge in S501, and subsequently, outputs the converted data to the pipeline 300 and transfers the data to the next filter in S502. After all the filters which are connected with the pipeline 300 have ended the processing, the output data is transmitted to the job controller 230 through the pipeline 300.

The data conversion processing shown in FIG. 16 is a flow when the processing has ended normally. In the data conversion of S501, there is a possibility of the occurrence of an error due to the improper data, and the data conversion processing is not always performed normally to the end. Therefore, each of the filters starts the event loop processing at the time when it is loaded similar to the job controller 230 and monitors the occurrence of the error.

Figure 15:
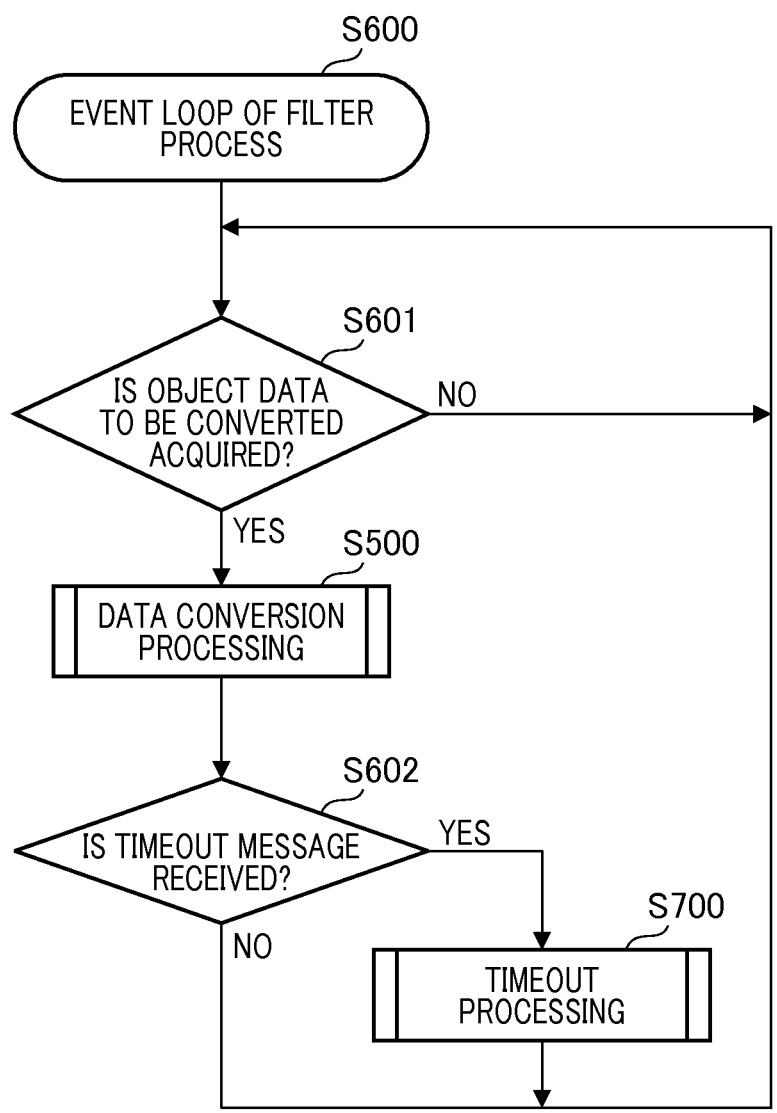
FIG. 15 is a process flow illustrating an outline of a filter processing.

FIG. 15 illustrates event loop processing (S600) by the filter. The filter continues circulating the loop while waiting for 2 events until the own process ends. The events are data acquisition and a timeout. In the event of S601, when the object data to be converted is acquired from the job controller 230 or the other filters, the filter executes the data conversion processing (S500) shown in FIG. 16. In S602, the filter determines whether or not a timeout message is received during the data conversion processing. When the conversion processing of which the filter itself is in charge has not been ended in the predetermined time and the timeout message has been received from the system timer, the processing proceeds to S700 and timeout processing is executed.

Figure 17:
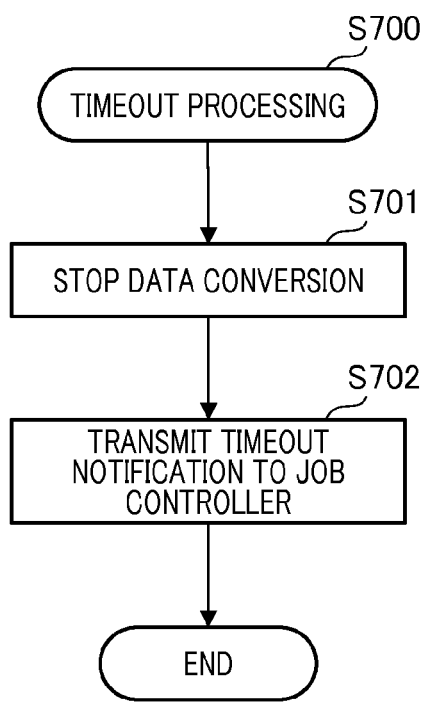
FIG. 17 is a process flow illustrating a timeout processing of a filter.

FIG. 17 illustrates a process flow of the timeout processing (S700). The filter that has received the timeout message stops the data conversion processing from being executed in S701, and transmits a timeout notification to the job controller 230 in S702. The job controller 230, which has received the notification, generates the event S102 shown in FIG. 11.

The event S102 is generated not only by the timeout notification from the filter but also by an abnormal end of the filter that is caused by improper object data to be converted. When the filter is ended abnormally due to the error, the filter cannot transmit the message to the job controller 230. However, when any of the filters of the filter group is ended abnormally, a mechanism is provided to interrupt the pipeline 300. Accordingly, the job controller 230 confirms the abnormal end by confirming the state of the pipeline 300 and can generate the event S102.

Figure 13:
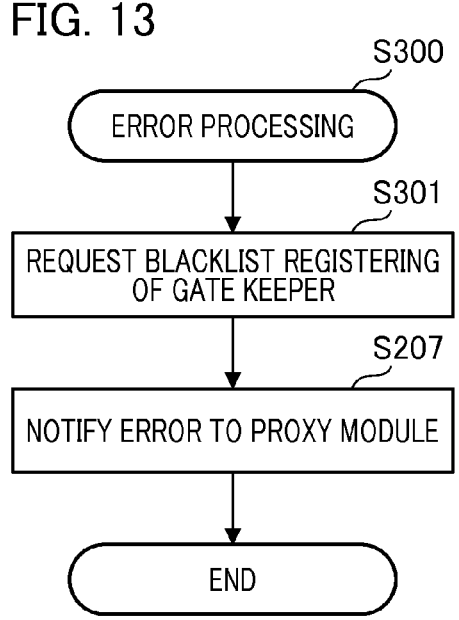
FIG. 13 is a process flow illustrating an error processing.

FIG. 13 illustrates a process flow of the error processing (S300) executed by the job controller 230 when the event S102 is generated. In S301, the job controller 230 requests the gate keeper 201 to register the hash value of the object data to be converted, which has caused the error, in the blacklist 200. When the gate keeper 201 receives the request from the job controller 230, the gate keeper 201 registers the hash value previously calculated in S401 to the blacklist. The job controller 230 notifies the proxy module 220 about the error (S207), and ends the error processing.

In the present embodiment, all object data to be converted that have generated errors in the data conversion processing (S500) are registered in the blacklist in S301, but as described above, the possibility may be considered that the error occurs depending not on the data but the timing. For example, after occurrence of an error (S102), data conversion processing (S500) may be retried and when the error occurs again, the object data to be converted may be registered to the blacklist.

Fourth Embodiment

A description will be given of an embodiment in which the system of the second embodiment is applied to the printing data conversion unit 330 of the third embodiment. The event loop processing of the job controller 230 of the present embodiment is similar to FIG. 11 and the event that the job controller 230 receives does not differ. However, the processing that is performed when the event is generated partly differs. Hereinafter, a description of the processing similar to the third embodiment is omitted.

The job execution processing (S210) of the event S101 when the job controller 230 has acquired the object data to be acquired is shown in FIG. 19. FIG. 19 illustrates the job execution processing when the "alert mode" of the second embodiment is introduced to the printing data conversion unit 330. A "current state" (whether or not "alert mode") of the printing data conversion unit 330 is held and managed by the gate keeper 201. In the job execution processing in S210, first the job controller 230 queries the gate keeper 201 about the "current state". In S212, the job controller receives a reply whether or not the "current state" held by the gate keeper 201 is on alert.

In S202, when it is not on alert, the processing proceeds to S204 and the object data to be converted is transferred to the filter group to thereby execute the data conversion processing (S500). In S205, when the job controller 230 receives the output data from the filter group, similar to the third embodiment, the job controller 230 outputs the converted data to the proxy module 220 in S206. Finally, the job controller 230 notifies the processing end (S213) by transmitting a completion message 303 to the gate keeper 201.

In S202, when it is on alert, the job controller 230 requests the gate keeper for the blacklist retrieval. The gate keeper 201 performs the blacklist retrieval processing (S400). In S213, the job controller 230 receives the blacklist retrieval result from the gate keeper 201. S203 and the following processes are similar to the process described in FIG. 12.

FIG. 20 illustrates the error processing (S310) of event S102 when the error has occurred in the job controller 230. In S310, the error processing starts, and in S311, the job controller 230 transmits an error message to the gate keeper 201 to thereby issue a warning. Subsequently, the job controller 230 requests of the gate keeper 201 to register the blacklist as similar to the third embodiment and notifies the proxy module 220 about the error (S207). The gate keeper 201 determines the current state using the alert message 301 and the completion message 303 transmitted sequentially from the job controllers 230 of each of the printing data conversion units 330 which are operated in plurality. When the gate keeper 201 receives the alert message 301, the current state becomes "alert mode", and when the completion messages 303 are received continuously for predetermined times while in the "alert mode", the "alert mode" will be canceled.

As described above, according to the printing data conversion system of the present invention, when unknown improper data has been received, a similar error will not occur in the system if the similar data is received again, and it enables preventing the data processing from being stopped.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-013570, filed Jan. 28, 2014, which is hereby incorporated by reference wherein in its entirety.

What is claimed is:

1. A system comprising:
at least one processor coupled to a memory device and programmed to function as:
a plurality of processing units that are each configured to receive a file to be processed and perform data processing on the file;
a registering unit configured to register identification information of a file if an error has occurred during the data processing on the file; and
a starting unit configured to start a plurality of the processing units in accordance with a number of received files for performing distributed processing on files that are received continuously,
wherein if at least one processing unit of the plurality of the processing units started by the starting unit is stopped due to the occurrence of the error during the data processing of a respective received file, the registering unit registers identification information for that file and, if another processing unit determines that a newly received file has identification information that is identical to the identification information registered by the registering unit, the other processing unit performs error notification without performing the data processing on the newly received file.

2. The system according to claim 1, wherein the identification information is a hash value.

3. The system according to claim 1, wherein the registering unit registers the processing file as an improper file if the processing unit cannot complete the data processing within a predetermined time period.

4. The system according to claim 1, wherein the processing unit performs conversion processing that converts the received file to printing data using a filter pipeline configured of a plurality of filters.

5. The system according to claim 4, wherein the registering unit registers the processing file as an improper file if the processing unit cannot complete the data processing within predetermined time periods, which are set in each of the filters.

6. A system controlling method comprising:
receiving a file to be processed and performing data processing on the file by a processing unit;
registering identification information of the file to a registering unit if an error has occurred during the data processing on the file; and
starting a plurality of the processing units in accordance with a number of received files for performing distributed processing on files that are received continuously,
wherein if at least one processing unit of the plurality of the processing units started in the starting step is stopped due to the occurrence of the error during the data processing of a respective received file, identification information of that file is registered and, if another processing unit determines that a newly received file has identification information that is identical to the identification information registered in the registering step, the other processing unit performs error notification without performing the data processing on the newly received file.

7. The system controlling method according to claim 6, wherein the identification information is a hash value.

8. The system controlling method according to claim 6, wherein the registering unit registers the processing file as an improper file if the processing unit cannot complete the data processing within a predetermined time period.

9. The system controlling method according to claim 6, wherein the processing unit performs conversion processing which converts the received file to printing data using a filter pipeline configured of a plurality of filters.

10. The system controlling method according to claim 9, wherein the registering unit registers the processing file as an improper file if the processing unit cannot complete the data processing within predetermined time periods, which are set in each of the filters.

11. A non-transitory computer-readable storage medium storing a program that when executed causes a computer to perform a system controlling method comprising:
receiving a file to be processed and performing data processing on the file by a processing unit;
registering identification information of the file to a registering unit if an error has occurred during the data processing on the file; and
starting a plurality of the processing units in accordance with a number of received files for performing distributed processing on files that are received continuously,
wherein if at least one processing unit of the plurality of the processing units started in the starting step is stopped due to the occurrence of the error during the data processing of a respective received file, identification information of that file is registered and, if another processing unit determines that a newly received file has identification information that is identical to the identification information registered in the registering step, the other processing unit performs error notification without performing the data processing on the newly received file.

* * * * *